Nov. 15, 1966   E. L. RESLER, JR   3,285,179
MAGNETIC INDUCTION MACHINE
Filed Oct. 12, 1964   2 Sheets-Sheet 1

INVENTOR.
EDWIN L. RESLER, JR.
BY Philip Schneider
Louis D. Applebaum
ATTORNEYS

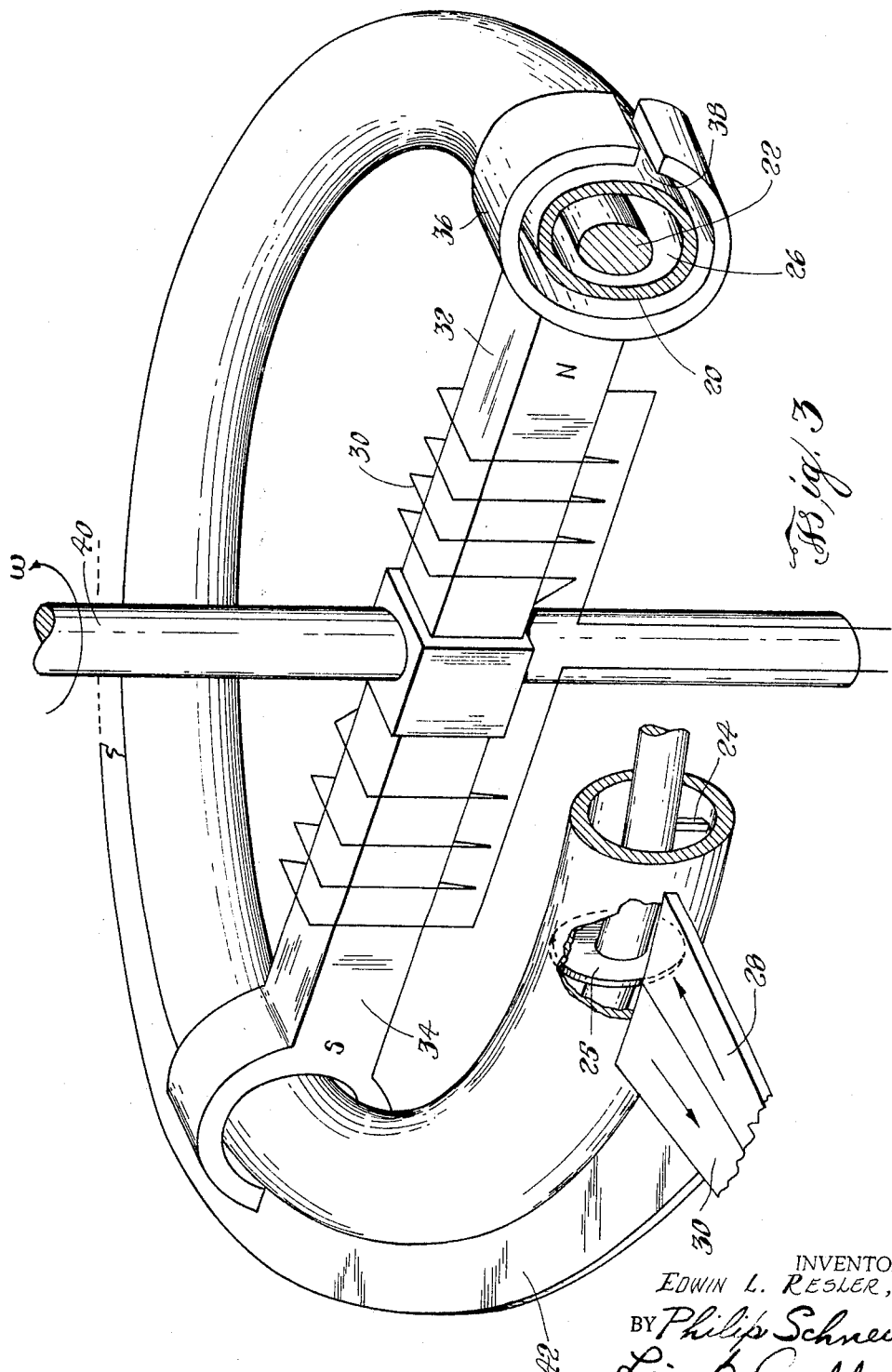

United States Patent Office 3,285,179
Patented Nov. 15, 1966

3,285,179
MAGNETIC INDUCTION MACHINE
Edwin L. Resler, Jr., Ithaca, N.Y., assignor, by mesne assignments, to the United States of America as represented by the Secretary of the Navy
Filed Oct. 12, 1964, Ser. No. 403,420
9 Claims. (Cl. 103—1)

This invention relates to a magnetic induction machine and especially to an electromagnetic induction pump having an annular flow channel.

The are many pumps in existence which have been designed to pump conducting fluids such as mercury, or liquid sodium which is used in some nuclear reactors. One type of pump is the linear pump with crossed electric and magnetic fields, which has power requirements of thousands of amperes at only a few volts D.-C. Rectifiers are inefficient at low voltages and the only efficient sources of such power are homopolar generators which are very bulky. A.-C. types of crossed field pumps have also been built but the necessary time-varying magnetic fields induce large, useless eddy currents in the pumped fluid which results in very low efficiency and low output.

Electromagnetic induction pumps have been built in which a conducting fluid is driven by a force which results from the interaction between a moving magnetic field and the field of the current which is induced in the fluid. The Joule loss efficiency for these pumps is of the order of the ratio of the fluid velocity to a characteristic magnetic field velocity, but the output and overall efficiency have been low because of failure of the designs to utilize the entire current circuit to drive the fluid.

It is also desirable in many types of pumps as, for example, nuclear reactor pumps, to construct the flow channel without seals since it is very difficult to prevent leakage at the seals.

The objects and advantages of the present invention are accomplished by utilizing the entire current circuit to interact with the moving magnetic field and produce the driving force. This is accomplished by an embodiment in which the flow channel is shaped in the form of a hollow ring, enclosing a circular core of ferromagnetic material. The moving magnetic field is provided by a set of mechanically driven arms which rotate around the hollow ring.

An object of the invention is to utilize the entire current circuit to produce driving force in a rotary electromagnetic induction pump.

Another object is to eliminate end losses in a rotary electromagnetic induction pump.

A further object is to obtain maximum output per unit size of a rotary electromagnetic induction pump.

Yet another object is to provide a seal-less electromagnetic induction pump.

Other objects and many of the attendant advantages of this invention will be readily appreciated as the same becomes better understood by reference to the following detailed description when considered in connection with the accompanying drawings wherein:

FIG. 3 is a schematic illustration of an embodiment of the invention.

Figure 1:
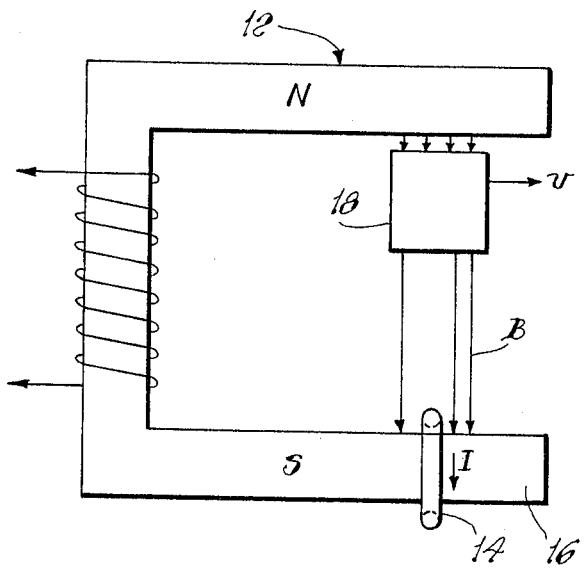
FIG. 1 is a schematic illustration of the principle upon which the electromagnetic induction pump is based.

FIG. 1 illustrates the principle behind the electromagnetic induction pump. Consider an electromagnet 12 which has a conductive wire loop 14 wrapped slidably around one of its pole pieces 16. Let a piece of ferromagnetic material 18 be placed between the pole pieces as shown. A magnetic field with magnetic induction lines B will extend between the piece of ferromagnetic material 18 and the pole pieces of the electromagnet.

If the piece of ferromagnetic material 18 is now moved in the direction of the arrow $v$, a current I is induced in the wire loop 14 in such a direction as to oppose the change in magnetic field (or to preserve the magnetic flux which it encloses). This direction is out of the paper in the portion of the loop lying above the lower pole piece within the field of the magnet.

Figure 2:
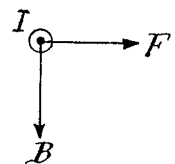
FIG. 2 is a vector diagram of the dimensional relation between the current through the wire loop I, the magnetic induction B, and the force F generated by the reaction between I and B.

The interaction of the field produced by this induced current and the field of the electromagnet produces a force $\vec{F} = \vec{I} \times \vec{B}$ on the wire loop 14 which acts in the direction of motion of the piece of ferromagnetic material 18. This is indicated in FIG. 2. Thus, as this piece 18 moves, the wire loop 14 is forced to move along with it.

An embodiment of the invention partially broken away to illustrate the parts inside the hollow ring is shown in schematic form in FIG. 3. A hollow ring 20 concentrically encloses a rodlike circular core 22 which can, for example, be supported within the ring 20 by three or more spaced columns or buttons 24, only one of which is shown. Thus, a flow channel 26 is formed between the core 22 and the ring 20.

An inlet pipe 28 and an outlet pipe 30 couple with the flow channel 26 and a diaphragm 25 is set transversely across the flow channel 26 between the inlet and outlet pipe connections to the flow channel so that fluid in the channel cannot flow around the channel more than once.

The magnetic field is derived from an electromagnet comprising a coil 30 wound on a pair of oppositely extending ferromagnetic arms 32 and 34 stretching diametrically across the hollow ring 20. Each arm ends in a gapped pole piece 36 which concentrically circles the outside of the hollow ring 20. The arms 32 and 34 are mounted for rotation on a shaft 40. Only one pair of arms 32 and 34 is shown in the diagram for the sake of clarity although more are desirable. The pump becomes more efficient as more of the arc length of the hollow ring 20 (i.e., of the conducting fluid within the ring) is covered by the magnetic field.

The most efficient configuration would consist of two arms, each having a graded pole piece which extends half way round the circumference of the hollow ring 20. Thus, the entire circle of fluid would be employed to produce current and driving force.

The entire assembly can be mounted in a housing (not shown), the hollow ring 20 being supported, for example, by a circumferential flange 42, a portion of which is shown at the left side of FIG. 3. The width of the flange 42 and of the inlet and outlet pipes 28 and 30 are less than the width of the gap 38 in the gapped pole piece so that they do not interfere with the rotation of the pole pieces.

The electromagnet arms 32 and 34 and the core 22 should be made of ferromagnetic material, such as soft iron. The hollow ring 20 may be made of fibreglass, or stainless steel, for example, or any strong, nonmagnetic material not affected by contact with the particular fluid which is to be pumped. Inert coatings, of a material such as a plastic, may also be used on the outer surface of the core and the inner surface of the hollow ring and the inlet and outlet pipes to avoid corrosive effects.

In operation, a D.-C. current passed through the coil 30 induces a radial field from the pole pieces 36 to the core 22 through the conductive fluid which fills the flow channel, the fluid being mercury or liquid sodium, for example. The magnetic circuit from each pole piece is completed to the other pole piece through the ferromagnetic core. The presence of the core permits the establishment of a strong radial induction field through the fluid between the gapped pole pieces and the core without demanding an excessive value of ampere-turns for the magnetizing field. The movement of the arms and the pole pieces causes a cylinder of current to flow in the liquid, the flow of current being concentric with the circumference of the flow channel as viewed in a transverse cross-section of the hollow ring 20. The interaction between the field of this current flow and the electromagnetic field produces an azimuthal force, in a direction tangent to the core 22 at every point, the force constituting, in effect, a magnetic turbine blade which drives the fluid within the flow channel as the pole pieces rotate.

Of course, it is apparent to those skilled in the art, that the basic combination of the invention can also be employed as a motor and as a generator. If the fluid is forced to circulate around the flow channel by an external driving source, the pole pieces will be caused to rotate. The resulting shaft rotation can then be used as a rotational drive source to do mechanical work or to drive the rotor of an electrical generator.

Obviously many modifications and variations of the present invention are possible in the light of the above teachings. It is therefore to be understood that within the scope of the appended claims the invention may be practiced otherwise than as specifically described.

I claim:
1. A magnetic induction machine comprising, in combination:
   a hollow ring of nonmagnetic material formed with an inlet and an outlet port;
   a circular core of ferromagnetic material located within said ring, said ring concentrically surrounding said core to form an annular flow channel therebetween;
   a diaphragm placed transversely across said flow channel between said inlet and outlet ports;
   inlet and outlet conduits coupled respectively with said inlet and outlet ports;
   an electrically conductive fluid filling said flow channel and said inlet and outlet conduits; and
   rotatable magnetic means for establishing a radial magnetic field in said fluid in said annular flow channel.

2. A machine as set forth in claim 1, wherein said rotatable magnetic means comprises:
   a rotatable shaft located at the center of said hollow ring, the axis of said shaft being collinear with the axis of said ring; and
   at least a pair of ferromagnetic arms affixed to said shaft and extending radially outward from, and on opposite sides of, said shaft, each said arm ending in a gapped circular pole piece which encircles said hollow ring, the width of the gap being sufficient to permit the pole piece to clear said inlet and outlet conduits when said pole pieces are rotated past said conduits, one arm being magnetized as a north pole and the other as a south pole.

3. An electromagnetic induction machine comprising, in combination:
   a hollow ring of nonmagnetic material formed with an inlet and an outlet port;
   a circular core of ferromagnetic material located within said ring, said ring concentrically surrounding said core to form an annular flow channel therebetween;
   a diaphragm placed transversely across said flow channel between said inlet and outlet ports;
   inlet and outlet conduits coupled respectively with said inlet and outlet ports;
   an electrically conductive fluid filling said flow channel and said inlet and outlet conduits; and
   rotatable electromagnetic means for establishing a radial magnetic field in said fluid in said annular flow channel.

4. A machine as set forth in claim 3, wherein said rotatable electromagnetic means comprises:
   a rotatable shaft located at the center of said hollow ring, the axis of said shaft being collinear with the axis of said ring; and
   at least a pair of ferromagnetic arms affixed to said shaft and extending radially outward from, and on opposite sides of, said shaft, each said arm ending in a gapped circular pole piece which encircles said hollow ring, the width of the gap being sufficient to permit the pole piece to clear said inlet and outlet conduits when said pole pieces are rotated past said conduits, one arm being electromagnetically magnetized as a north pole and the other as a south pole.

5. An electromagnetic induction machine comprising, in combination:
   a hollow ring of nonmagnetic material formed with an inlet and an outlet port;
   a rodlike circular core of ferromagnetic material located within said ring, said ring concentrically surrounding said core to form a flow channel therebetween;
   means for supporting said core within said hollow ring;
   a diaphragm placed transversely across said flow channel between said inlet and outlet ports, said ports being placed close to said diaphragm;
   inlet and outlet conduits coupled respectively with said inlet and outlet ports;
   an electrically conductive fluid filling said flow channel and said inlet and outlet conduits; and
   rotatable electromagnetic means for establishing a radial magnetic field in said fluid in said annular flow channel, said means comprising
      a rotatable shaft located at the center of said hollow ring, the axis of said shaft being collinear with the axis of said ring,
      at least a pair of ferromagnetic arms affixed to said shaft and extending radially outward from, and on opposite sides of, said shaft, each said arm ending in a gapped circular pole piece which encircles said hollow ring, the width of the gap being sufficient to permit the pole piece to clear said inlet and outlet conduits when said pole pieces are rotated past said conduits, and
      means for electromagnetizing one arm as a north pole and the other as a south pole.

6. An electromagnetic induction pump comprising, in combination:
   a hollow ring of nonmagnetic material formed with an inlet and an outlet port;
   a circular core of ferromagnetic material located within said ring, said ring concentrically surrounding said core to form an annular flow channel therebetween;
   a diaphragm placed transversely across said flow channel between said inlet and outlet ports;
   inlet and outlet conduits coupled respectively with said inlet and outlet ports;
   an electrically conductive fluid filling said flow channel and said inlet and outlet conduits;
   rotatable electromagnetic means for establishing a radial magnetic field in said fluid in said annular flow channel; and
   means for rotating said electromagnetic means.

7. A pump as set forth in claim 6, wherein said rotatable electromagnetic means comprises:
   a rotatable shaft located at the center of said hollow ring, the axis of said shaft being collinear with the axis of said ring;
   at least a pair of ferromagnetic arms affixed to said shaft and extending radially outward from, and on opposite sides of, said shaft, each said arm ending in a gapped circular pole piece which encircles said hollow ring, the width of the gap being sufficient to permit the pole piece to clear said inlet and outlet conduits when said pole pieces are rotated past said conduits; and means for electromagnetizing one arm as a north pole and the other as a south pole.

8. An electromagnetic induction pump comprising, in combination:

a hollow ring of nonmagnetic material formed with an inlet and an outlet port;

a rodlike circular core of ferromagnetic material located within said ring, said ring concentrically surrounding said core to form a flow channel therebetween;

means for supporting said core within said hollow ring;

a diaphragm placed transversely across said flow channel between said inlet and outlet ports, said ports being placed close to said diaphragm;

inlet and outlet conduits coupled respectively with said inlet and outlet ports;

an electrically conductive fluid filling said flow channel and said inlet and outlet conduits;

rotatable electromagnetic means for establishing a radial magnetic field in said fluid in said annular flow channel; and means for rotating said rotatable electromagnetic means.

9. A pump as set forth in claim 8, wherein said rotatable electromagnetic means comprises:

a rotatable shaft located at the center of said hollow ring, the axis of said shaft being collinear with the axis of said ring, at least a pair of ferromagnetic arms affixed to said shaft and extending radially outward from, and on opposite sides of, said shaft, each said arm ending in a gapped circular pole piece which encircles said hollow ring, the width of the gap being sufficient to permit the pole piece to clear said inlet and outlet conduits when said pole pieces are rotated past said conduits; and means for electromagnetizing one arm as a north pole and the other as a south pole.

References Cited by the Examiner
UNITED STATES PATENTS

| | | | |
|---|---|---|---|
| 2,730,951 | 1/1956 | Donelian | 103—1 |
| 2,787,219 | 4/1957 | Werner | 103—1 |
| 2,928,349 | 3/1960 | Findlay | 103—1 |
| 2,982,214 | 5/1961 | Cochran | 103—1 |
| 3,008,418 | 11/1961 | Blake | 103—1 |
| 3,038,409 | 6/1962 | Edgerly | 103—1 |
| 3,154,017 | 10/1964 | Edgerly | 103—1 |

LAURENCE V. EFNER, *Primary Examiner.*